(12) United States Patent
Seitz et al.

(10) Patent No.: US 8,669,017 B2
(45) Date of Patent: Mar. 11, 2014

(54) METHOD FOR CHECKING THE SEAL OF A STACK OF FUEL CELLS

(75) Inventors: Sandra Seitz, Düsseldorf (DE); Rudi Widt, Köln (DE)

(73) Assignee: Inficon GmbH, Cologne (DE)

( * ) Notice: Subject to any disclaimer, the term of this patent is extended or adjusted under 35 U.S.C. 154(b) by 291 days.

(21) Appl. No.: 13/133,903

(22) PCT Filed: Dec. 9, 2009

(86) PCT No.: PCT/EP2009/066753
§ 371 (c)(1),
(2), (4) Date: Jul. 13, 2011

(87) PCT Pub. No.: WO2010/066802
PCT Pub. Date: Jun. 17, 2010

(65) Prior Publication Data
US 2011/0262823 A1    Oct. 27, 2011

(30) Foreign Application Priority Data
Dec. 11, 2008    (DE) .......................... 10 2008 061 807

(51) Int. Cl.
*H01M 8/04*    (2006.01)
*H01M 8/24*    (2006.01)

(52) U.S. Cl.
USPC .......................................... 429/443; 429/455

(58) Field of Classification Search
USPC ................................................ 429/443, 455
See application file for complete search history.

(56) References Cited

U.S. PATENT DOCUMENTS

| 5,235,846 | A | 8/1993 | Fanciullo |
| 5,537,857 | A | 7/1996 | Grosse Bley |
| 6,492,043 | B1 | 12/2002 | Knights et al. |
| 7,717,681 | B2 | 5/2010 | Bohm et al. |
| 2004/0209127 | A1 * | 10/2004 | Wang et al. ................. 429/13 |

FOREIGN PATENT DOCUMENTS

| DE | 41 40 366 A1 | 6/1993 | |
| DE | 103 19 633 A1 | 11/2004 | |
| JP | 2002-5777 A | 1/2002 | |
| JP | 2002005777 A * | 1/2002 | ............. G01M 3/20 |
| Wo | 2005054806 A1 | 6/2005 | |
| WO | 2008/032838 A1 | 3/2008 | |

* cited by examiner

*Primary Examiner* — Karie O'Neill Apicella
(74) *Attorney, Agent, or Firm* — Craig Metcalf; Kirton McConkie

(57) ABSTRACT

A stack (10) of fuel cells (11) is to be tested for tightness of the fuel cell membranes. For this purpose, a tracer gas is introduced into the fuel feed channel (15) of the stack (10). The fuel discharge channel (16) is either open or it is closed. A carrier gas is fed to the feed air channel. (17) and led through the exhaust air channel (18) to a gas sensor (28) where a determination is made whether the carrier gas contains amounts of tracer gas. A defective fuel cell (11) can be located by introducing a lance comprising a sniffing probe into the corresponding channel (18) and determining the position of the probe.

16 Claims, 2 Drawing Sheets

METHOD FOR CHECKING THE SEAL OF A STACK OF FUEL CELLS

Figure 1:
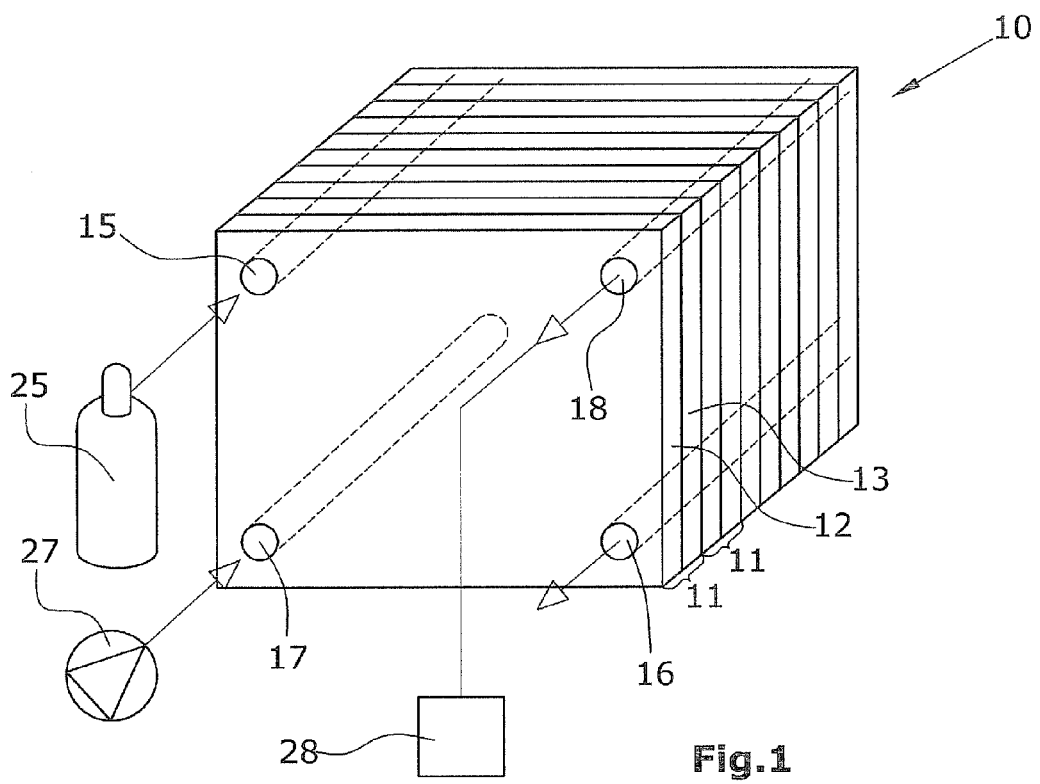

This application is a National Stage of International Application No. PCT/EP2009/066753, filed Dec. 9, 2009, and entitled METHOD FOR CHECKING THE SEAL OF A STACK OF FUEL CELLS, which claims the benefit of DE 10 2008 061 807.1, filed Dec. 11, 2008. This application claims priority to and incorporates herein by reference the above-referenced applications in their entirety.

The invention refers to a method for checking the tightness of a stack of fuel cells, wherein the stack comprises:
- a plurality of fuel cells, each comprising a first chamber, a second chamber and a membrane separating the chambers,
- a fuel feed channel and a fuel discharge channel, respectively connected with the first chambers of the fuel cells, and
- a feed air channel and an exhaust air channel, respectively connected with the second chambers of the fuel cells.

It is known to check the gas-tightness of hollow bodies by introducing a tracer gas into the hollow body. A carrier gas is passed along the outer side of the hollow body and is supplied to a gas detector. If proportions of tracer gas appear in the carrier gas, a leak in the hollow body is inferred therefrom. Corresponding leak detection systems are described in WO 2005/054806 A1. It is also possible to create a tracer gas atmosphere outside the hollow body and to pass a carrier gas through the hollow body. In this case, it is detected whether a passage of tracer gas has occurred from the outside inward with respect to the hollow body.

Gas sensors suitable for use in combination with a leak detector are described in DE 4140366 A1 (Leybold) and DE 10319633 A1 (Inficon). These gas sensors are capable of selectively detecting the presence of a certain tracer gas in a gas flow. The tracer gas of choice is helium, however, other tracer gases can be used as well, such as hydrogen, for instance. The gas sensor may be a mass spectrometer or a gas-selectively responsive partial pressure sensor.

It is an object of the invention to provide a method for checking the tightness of a stack of fuel cells, which allows for an effective and fast leak detection.

The method of the invention is defined by claim 1. It is characterized in that the first chambers or the second chambers of a fuel cell are connected to a tracer gas source and that at least one of the channels (fuel feed channel, fuel discharge channel, feed air channel, exhaust air channel) of the respective other chambers is connected to a gas sensor responsive to the tracer gas.

The method according to the invention allows for checking the tightness of fuel cell stacks in the assembled state. Here, the fact is utilized that the fuel chambers (or the air chambers) of the entire plate stack can be connected to the same tracer gas source in order to check the tightness of all chambers in the plate stack. For example, the fuel-carrying side is supplied with tracer gas. By permeation, a part of the tracer gas reaches the side that will later carry air. If a proportion of tracer gas can be detected in the side that will later carry air that is larger than the proportion caused by permeation, one can infer therefrom that a leak exists in the membrane.

The invention allows for a fast, economic and effective checking of the entire fuel cell stack in a single step.

In a preferred embodiment of the invention it is provided that the respective other chambers are flown through by a carrier gas and that the carrier gas flow leaving these chambers is supplied to the gas sensor. The carrier gas flow absorbs the tracer gas that has passed through a leak and transports the same to the gas sensor which responds to the tracer gas in a gas selective manner.

The method according to the invention not only allows for a mere detection of the presence of a leak, but also for the localisation thereof within the plate stack. For this purpose, the gas sensor comprises a lance provide with a sniffer probe, the lance being inserted into the respective channel and moved therein in the longitudinal direction. Upon a response by the gas sensor, the position of the sniffer probe in the channel is detected in order to thereby localize an existing leak. The response of the gas sensor can be determined when an abrupt increase in the tracer gas concentration occurs as the probe is moved.

The following is a detailed description of an embodiment of the invention with reference to the drawings.

Figure 2:
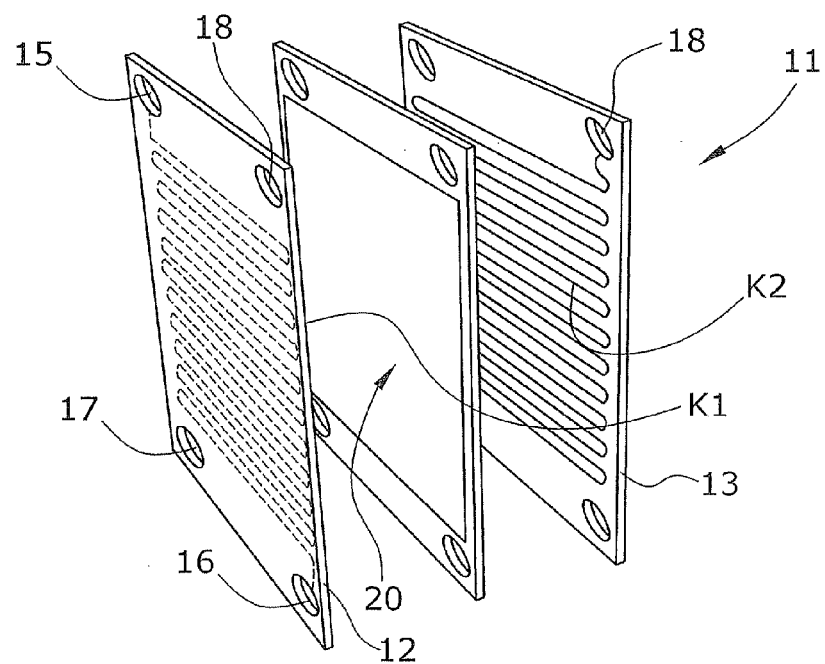
Figure 3:
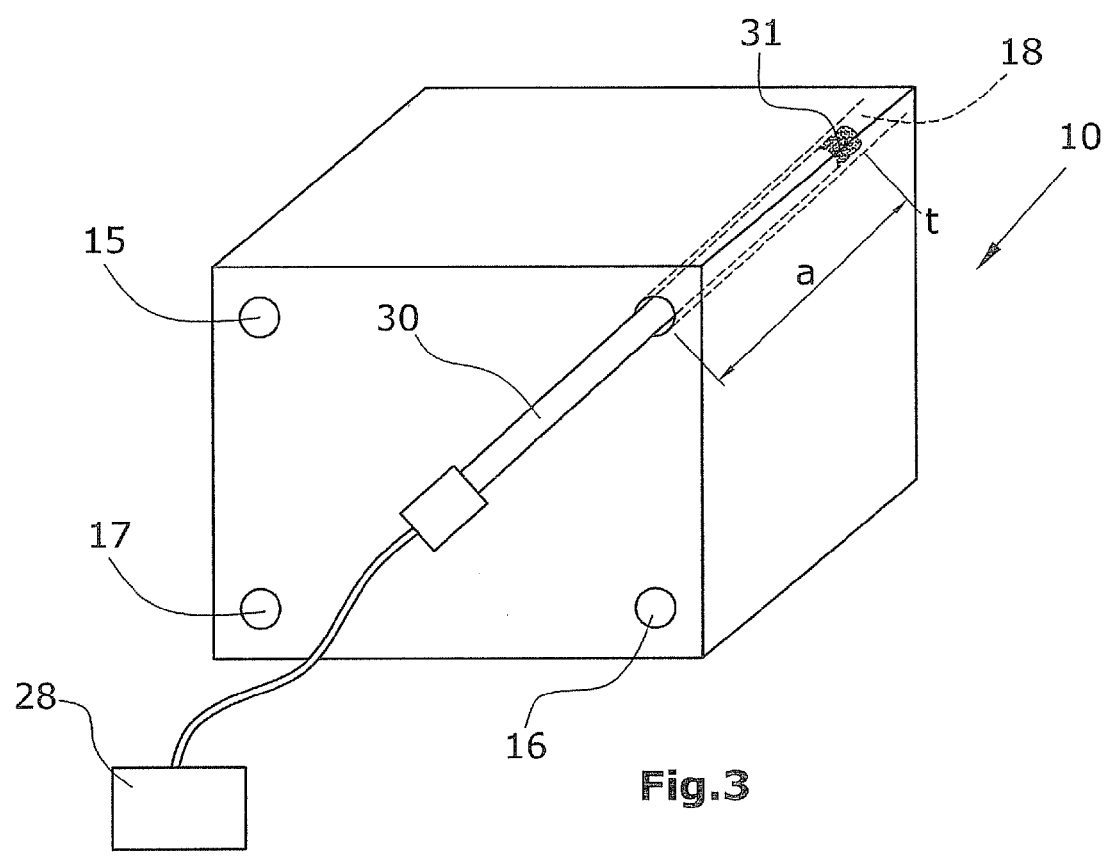

In the Figures:

FIG. 1 is a schematic illustration of a fuel cell stack during the tightness check, FIG. 2 is an exploded view of a fuel cell included in the stack, comprising a first chamber through which fuel is passed and a second chamber through which air is passed, and FIG. 3 illustrates the fuel cell stack during the localization of a leak using a sniffer probe mounted to a lance.

FIG. 1 illustrates a stack 10 of fuel cells 11. Each fuel cell is formed by two congruent plates 12 between which a membrane is provided that is not illustrated in FIG. 1. The rectangular fuel cells 11 are assembled to form the stack. The stack has a total of four channels. A fuel feed channel 15 extends through the stack near the top left corner of the front plate, the channel being connected with the respective first chamber within each fuel cell. A fuel discharge channel 16 extends near the bottom right corner of the front plate 11. And also extends over the entire length of the stack. The fuel discharge channel 16 is connected with the second chambers of all fuel cells 11. With respect to one plate, the fuel feed channel and the fuel discharge channel are arranged diagonally relative to each other.

The other two channels, also arranged diagonally with respect to each other, are a feed air channel 17 and an exhaust air channel 18. These are connected to the second chambers of the fuel cells and also extend linearly along the entire length of the stack.

FIG. 2 illustrates the structure of a fuel cell 11 with the two plates 12, 13. A membrane is provided between the two plates 12, 13, which membrane may be held by a plate-shaped frame. The plates 12, 13 each have a meander-shaped chamber K1, K2, respectively, provided on their inner side facing the membrane 20. The chambers are grooves in the plate surface, with the chamber K1 being the fuel chamber and the chamber K2 being the air chamber. The first chamber K1 is connected to the fuel feed channel 15 and the fuel discharge channel 16. The second chamber K2 is connected to the feed air channel 17 and the exhaust air channel 18. The edges of the plates lie on each other in a sealing manner so that the chambers K1, K2 are sealed to the outside. On the rear of the stack, the channels 15, 16 are connected to the first chamber K1 of the last fuel cell 11, but are not guided outward. In a similar manner, the feed air channel 17 and the exhaust air channel 18 are closed on the rear side of the stack 10.

When the fuel cell is operated, the fuel feed channel 15 is supplied with gaseous or liquid fuel, such as hydrogen or methanol, for instance. The feed air channel 17 is connected to an air source, for instance a fan. Different electric potentials form at the plates 12, 13 whereby a voltage can be tapped as a useful voltage. Unused fuel escapes through the fuel discharge channel 16. The feed air channel 17 is connected to an air source. Heated air and water escape through the exhaust air channel 18. The fuel cell further includes an anode layer and a cathode layer and a catalyst. It splits hydrogen into positive hydrogen ions (protons) and negatively charged electrons. The polymer electrolyte membrane (PEM) only allows the positively charged ions to pass to the cathode. The negatively charged electrons must flow to the cathode through an external circuit, whereby electric current is generated. At the cathode, the positively charged hydrogen ions will combine with hydrogen, whereby water is formed that is drained from the cell.

FIG. 1 illustrates the method for checking the tightness of the stack 10. A tracer gas source 25 is connected to the fuel feed channel 15. The tracer gas flows through the first chambers K1 and exits from the same via the fuel discharge channel 16. There, the tracer gas may be captured or exhausted to atmosphere. The tracer gas used is hydrogen, helium, carbon dioxide or another well detectable gas. This gas is introduced into the stack 10 at a pressure slightly higher than atmospheric pressure.

The feed air channel 17 is connected to an air source 27 that forces a carrier gas, in the present instance air, into the feed air channel. The carrier gas flows through the second chambers K2 of all cells and exits from the stack via the exhaust air channel 18. The exhaust air channel 18 is connected to a gas sensor 28 which may be a conventional leakage detector.

If there is no leak in any of the cells, a part of the tracer gas will penetrate into the respective other chamber by permeation and will be discharged via the exhaust air channel 18. The gas sensor supplies a quantitative signal that also indicates the quantity of tracer gas detected. If a proportion of tracer gas is detected that is larger than the quantity due to permeation, a leak in a membrane of a chamber may be inferred therefrom.

FIG. 3 illustrates the localization of a leak within the stack 10 during leak detection. Here, as in FIG. 1, the fuel feed channel 15 is connected to a tracer gas source and the feed air channel 17 is connected to a pressurized air source, A lance 30 has been inserted into the exhaust air channel 18, which lance carries a sniffer probe 31 at its front end. The lance 30 is hollow and gas is sucked through the same by the gas sensor 28, which is a leak detector, the gas being analyzed for the presence of tracer gas. The respective position of the sniffer probe 31 in the longitudinal extension of the channel 18 is detected. The position at which an abrupt increase in the tracer gas concentration is detected marks the position of the leaking cell 11. In order to determine the position of the sniffer probe 31 within the stack 10, a length scale can be provided on the lance 30 so that a measured length can be read at the exit end of the exhaust air channel 18 that corresponds to the length a which is still in the stack 10.

During leak detection, the channel 16 may be open so that the tracer gas escapes. The channel 16 may also be closed with a stopper or another element so that a tracer gas pressure builds in the stack 10.

In the present embodiment, it has been stated that the first chambers K1 are flown through by tracer gas and the second chambers K2 are flown through by carrier gas which in the present case is air. These conditions may be inverted so that the first chambers are flown through by carrier gas and the second chambers are flown through by tracer gas.

The invention claimed is:

1. A method for checking the tightness of a stack of fuel cells, said stack comprising:
   a plurality of fuel cells, each having a first chamber, a second chamber and a membrane separating the chambers,
   a fuel feed channel and a fuel discharge channel connected to the first chambers of the fuel cells, and
   a feed air channel and an exhaust air channel connected to the second chambers of the fuel cells,
   wherein the first chambers or the second chambers are connected to a tracer gas source and at least one of the channels of the respective other chambers is connected to a gas sensor responsive to the tracer gas, and wherein the gas sensor comprises a lance provided with a sniffer probe, which lance is inserted into a respective channel and is moved therein in the longitudinal direction of the channel, and, upon a response of the gas sensor, the position of the sniffer probe in the channel is determined so as to thereby localize a leak.

2. The method of claim 1, wherein each fuel cell has a plate-shaped structure, the stack having a stack length determined by the number of the plate-shaped fuel cells, and wherein the fuel feed channel, the fuel discharge channel, the feed air channel and the exhaust air channel each extend linearly along the entire length of the stack.

3. The method of claim 1, wherein a carrier gas is passed through the respective other chambers and the carrier gas flow exiting from these chambers is supplied to the gas sensor.

4. The method of claim 2, wherein a carrier gas is passed through the respective other chambers and the carrier gas flow exiting from these chambers is supplied to the gas sensor.

5. The method of claim 1, wherein the response of the gas sensor is determined when an abrupt increase in the tracer gas concentration occurs while the probe is moved.

6. The method of claim 2, wherein the response of the gas sensor is determined when an abrupt increase in the tracer gas concentration occurs while the probe is moved.

7. The method of claim 3, wherein the response of the gas sensor is determined when an abrupt increase in the tracer gas concentration occurs while the probe is moved.

8. A fuel cell stack and leak detection assembly, comprising:
   a fuel cell stack, comprising:
      a plurality of fuel cells, each having a first chamber, a second chamber and a membrane separating the chambers,
      a fuel feed channel and a fuel discharge channel connected to the first chambers of the fuel cells, and
      a feed air channel and an exhaust air channel connected to the second chambers of the fuel cells, and
   a gas sensor, wherein the gas sensor comprises a lance provided with a sniffer probe, which lance is adapted for insertion into a respective channel and for movement therein in the longitudinal direction of the channel such that, upon a response of the gas sensor, the position of the sniffer probe in the channel is determinable so as to thereby localize a leak.

9. The assembly of claim 8, wherein each fuel cell has a plate-shaped structure, the stack having a stack length determined by the number of the plate-shaped fuel cells, and wherein the fuel feed channel, the fuel discharge channel, the feed air channel and the exhaust air channel each extend linearly along the entire length of the stack.

10. The assembly of claim 8, wherein the first chambers or the second chambers are adapted for connection to a tracer gas source and at least one of the channels of the respective other chambers is adapted for connection to the gas sensor, which gas sensor is responsive to the tracer gas, and wherein a carrier gas is passed through the respective other chambers and the carrier gas flow exiting from these chambers is supplied to the gas sensor.

11. The assembly of claim 9, wherein the first chambers or the second chambers are adapted for connection to a tracer gas source and at least one of the channels of the respective other chambers is adapted for connection to the gas sensor, which gas sensor is responsive to the tracer gas, and wherein a carrier gas is passed through the respective other chambers and the carrier gas flow exiting from these chambers is supplied to the gas sensor.

12. The assembly of claim 10, wherein the gas sensor is configured to respond when an abrupt increase in the tracer gas concentration occurs while the probe is moved.

13. The assembly of claim 11, wherein the gas sensor is configured to respond when an abrupt increase in the tracer gas concentration occurs while the probe is moved.

14. A method for detecting localized leaks within a stack of fuel cells, said method comprising:
   providing a stack of fuel cells, said stack comprising:
      a plurality of fuel cells, each having a first chamber, a second chamber and a membrane separating the chambers,
      a fuel feed channel and a fuel discharge channel connected to the first chambers of the fuel cells, and
      a feed air channel and an exhaust air channel connected to the second chambers of the fuel cells,
   providing a gas sensor, said gas sensor further comprising a lance provided with a sniffer probe,
   providing a tracer gas source,
   connecting one of the first chambers or the second chambers to said tracer gas source,
   connecting one of the channels of the respective other chambers to said gas sensor,
   inserting the lance into a respective channel,
   moving the lance within the respective channel in the longitudinal direction thereof, and
   determining the position of the sniffer probe upon a response of the gas sensor so as to thereby localize a leak.

15. The method of claim 14, wherein a carrier gas is passed through the respective other chambers and the carrier gas flow exiting from these chambers is supplied to the gas sensor.

16. The method of claim 15, wherein the response of the gas sensor is determined when an abrupt increase in the tracer gas concentration occurs while the probe is moved.

* * * * *